US011229154B2

(12) United States Patent
Hershbarger

(10) Patent No.: US 11,229,154 B2
(45) Date of Patent: Jan. 25, 2022

(54) AUTOMATIC PATH CORRECTION FOR GUIDED VEHICLES

(71) Applicant: Deere & Company, Moline, IL (US)

(72) Inventor: James Hershbarger, LeClaire, IA (US)

(73) Assignee: DEERE & COMPANY, Moline, IL (US)

( * ) Notice: Subject to any disclaimer, the term of this patent is extended or adjusted under 35 U.S.C. 154(b) by 353 days.

(21) Appl. No.: 16/120,604

(22) Filed: Sep. 4, 2018

(65) Prior Publication Data

US 2020/0068781 A1  Mar. 5, 2020

(51) Int. Cl.
*A01B 69/04* (2006.01)
*G05D 1/00* (2006.01)
*G05D 1/02* (2020.01)

(52) U.S. Cl.
CPC ......... *A01B 69/008* (2013.01); *G05D 1/0088* (2013.01); *G05D 1/0227* (2013.01); *G05D 1/0276* (2013.01); *G05D 2201/0201* (2013.01)

(58) Field of Classification Search
CPC .... A01B 69/008; A01B 69/08; G05D 1/0088; G05D 1/0227; G05D 1/0276; G05D 2201/0201; G05D 1/0278; G05D 1/0212; G05D 1/02; B62D 15/025; A01D 41/1278
See application file for complete search history.

(56) References Cited

U.S. PATENT DOCUMENTS

| 5,684,696 A * | 11/1997 | Rao ...................... G05D 1/0011 701/25 |
| 5,987,383 A * | 11/1999 | Keller ................. A01B 69/007 342/357.36 |
| 6,876,920 B1 * | 4/2005 | Mailer .................. A01B 69/00 701/470 |
| 7,716,905 B2 | 5/2010 | Wilcox et al. |
| 8,010,261 B2 | 8/2011 | Brubaker |
| 8,498,788 B2 | 7/2013 | Kondekar |
| 8,655,536 B2 | 2/2014 | Peake et al. |
| 9,826,673 B1 | 11/2017 | Ray et al. |

(Continued)

FOREIGN PATENT DOCUMENTS

| CN | 207225458 U | 4/2018 |
| WO | 2017180504 A1 | 10/2017 |

OTHER PUBLICATIONS

European Search Report issued in counterpad European Patent Application No. 19192747.4 dated Jan. 30, 2020 (7 pages).

*Primary Examiner* — Abby Y Lin
*Assistant Examiner* — Renee LaRose
(74) *Attorney, Agent, or Firm* — Michael Best & Friedrich LLP

(57) ABSTRACT

Disclosed are systems and methods to determine path selection for automated industrial vehicles. A control system includes a control unit operatively connected to a vehicle engine. A location device is operatively connected to the control unit. A steering controller is operatively connected to the control unit and configured to automatically control the path of the vehicle. The control unit includes a path correction system configured to, determine a current vehicle path from location data received from the location device, determine if the current vehicle path is different from a first automatic path, establish a second automatic path, and send a signal to the steering controller to follow the second automatic path.

20 Claims, 4 Drawing Sheets

(56) References Cited

U.S. PATENT DOCUMENTS

| | | | |
|---|---|---|---|
| 2011/0015817 A1* | 1/2011 | Reeve | G05D 1/0231 |
| | | | 701/25 |
| 2011/0118926 A1* | 5/2011 | Peake | G01C 21/34 |
| | | | 701/25 |
| 2012/0245817 A1* | 9/2012 | Cooprider | B60W 30/12 |
| | | | 701/70 |
| 2015/0334919 A1 | 11/2015 | Schleicher | |
| 2016/0041263 A1 | 2/2016 | Zielke et al. | |

* cited by examiner

AUTOMATIC PATH CORRECTION FOR GUIDED VEHICLES

FIELD

Various exemplary embodiments relate to path correction for guided vehicles, such as industrial vehicles.

BACKGROUND

Industrial vehicles include agricultural and construction equipment that is used to perform different industrial tasks. For example, combine harvesters combine the three separate operations of crop reaping, threshing, and winnowing into a single machine.

In certain cases, industrial vehicles are required to traverse or cover an entire area with one or more paths. For example, a vehicle may be required to plant crops, to harvest crops, or to distribute crop inputs, such as fertilizer or chemicals, over a field or plants within an entire area of a field. If the field has an ordinary rectangular shape, the vehicle operator may cover the entire area of the field by manually or automatically controlling the vehicle to follow an array of sub-paths through the field, where a location-determining receiver (e.g., Global Positioning System) receiver may provide location data to assist the operator in following the sub-paths.

SUMMARY

According to an exemplary embodiment, a method of implementing a vehicle path correction includes, determining if a vehicle automatic steering system is engaged and determining an automatic steering system first path. Vehicle location data is compiled. A current vehicle heading is determined from the compiled vehicle location data. It is determined if the difference between the current vehicle heading and the first path is above a current-heading threshold value. The compiled vehicle location data is analyzed to model a second path if the difference between the current vehicle heading and the first path is above the current-heading threshold value. It is determined if a difference between the first path and the second path is greater than a path threshold value. A new path is determined if the difference between the first path and the second path is greater than the path threshold value.

According to another exemplary embodiment, a vehicle control system includes a control unit operatively connected to a vehicle engine. A location device is operatively connected to the control unit. A steering controller is operatively connected to the control unit and configured to automatically control the path of the vehicle. The control unit includes a path correction system configured to, determine a current vehicle path from location data received from the location device, determine if the current vehicle path is different from a first automatic path, establish a second automatic path, and send a signal to the steering controller to follow the second automatic path.

According to another exemplary embodiment, an industrial vehicle includes an engine and a ground engaging member operatively coupled to the engine. A control unit is operatively connected to the engine. A location device is operatively connected to the control unit. A steering controller operatively connected to the control unit and the ground engaging member and configured to automatically control the path of the vehicle. The control unit includes a path correction system configured to, determine a current vehicle path from location data received from the location device, determine if the current vehicle path is different from a first automatic path, establish a second automatic path, and send a signal to the steering controller to follow the second automatic path.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

The term "side-to-side", "sideways", "laterally" or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of", "front", "forward", "fore" and the like refer to the direction of travel "V". The terms "back", "rear", "behind", "to the rear of" and the like refer to a direction opposite to the direction of travel "V".

Figure 1:
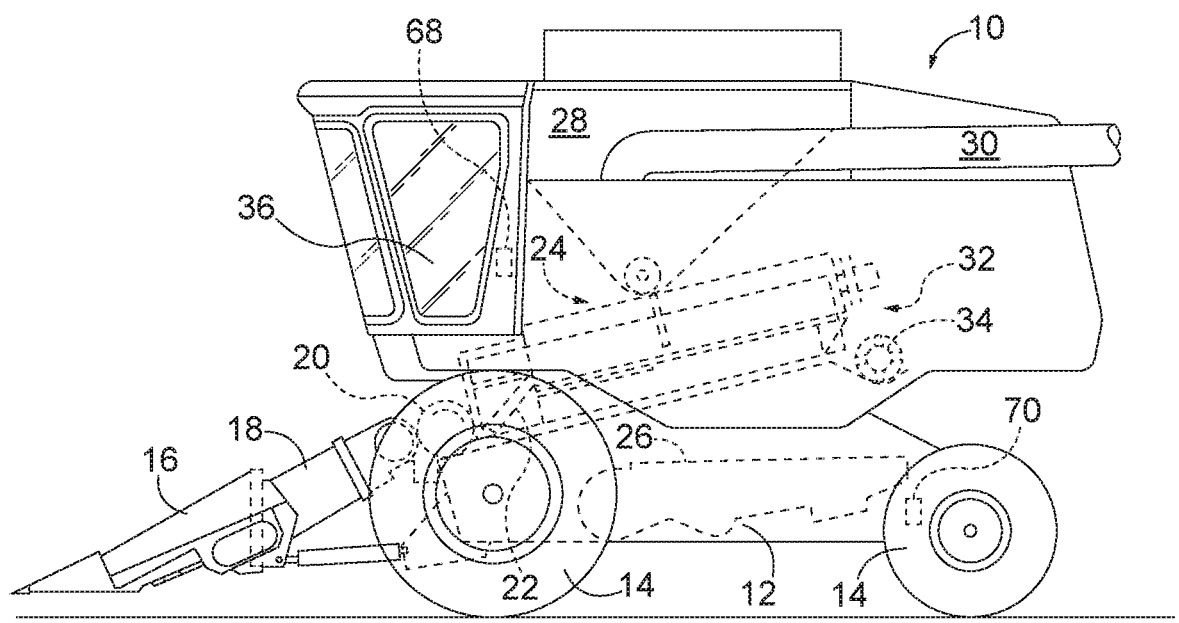
FIG. 1 is a side view of an exemplary industrial vehicle embodied as an agricultural harvester.

FIG. 1 shows an exemplary embodiment of an industrial vehicle illustrated as a harvesting machine 10 in the form of a combine harvester. The harvesting machine 10 comprises a supporting structure 12 associated with ground engaging members 14. Although the harvesting machine 10 is illustrated as having wheels, it could also have ground engaging tracks, either full tracks or half-tracks. A header 16 is mounted (e.g., detachably mounted) to a feederhouse 18. The feederhouse 18 contains a conveyor for conveying the harvested crop to a beater 20 or other upstream device associated with the harvesting machine 10. The beater 20 may direct the crop upwardly through an inlet transition section 22 or similar opening to a rotary threshing and separating assembly 24.

As shown in FIG. 1, the illustrated threshing and separating assembly 24 is axially arranged in the harvesting machine 10. However, in an alternate embodiment, the threshing and separating assembly 24 could be arranged in another orientation relative to the longitudinal axis of the harvesting machine. For example, the threshing and separating assembly 24 may be configured as a conventional transverse threshing cylinder and concave assembly (e.g., and straw walkers). The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger that feeds chute or outlet 30.

Threshed and separated material is discharged from the axial crop processing unit through outlet 32 to discharge beater 34 or discharge rotary device. The discharge beater 34 in turn propels the material out the rear of the harvesting machine 10. It should be noted that the discharge beater 34 could also discharge crop material other than grain directly to a straw chopper. The operation of the harvesting machine 10 may be controlled from an operator's cab 36 using one or more operator inputs (e.g. pedals, levers, wheels, joy-sticks, etc.) positioned in the cab 36. The harvesting machine 10 can also be operated remotely via a wireless transceiver arrangement or via an on-board navigation system (e.g., optical navigation system or a location-determining receiver, such as a Global Positioning System (GPS) receiver with differential correction).

Figure 2:
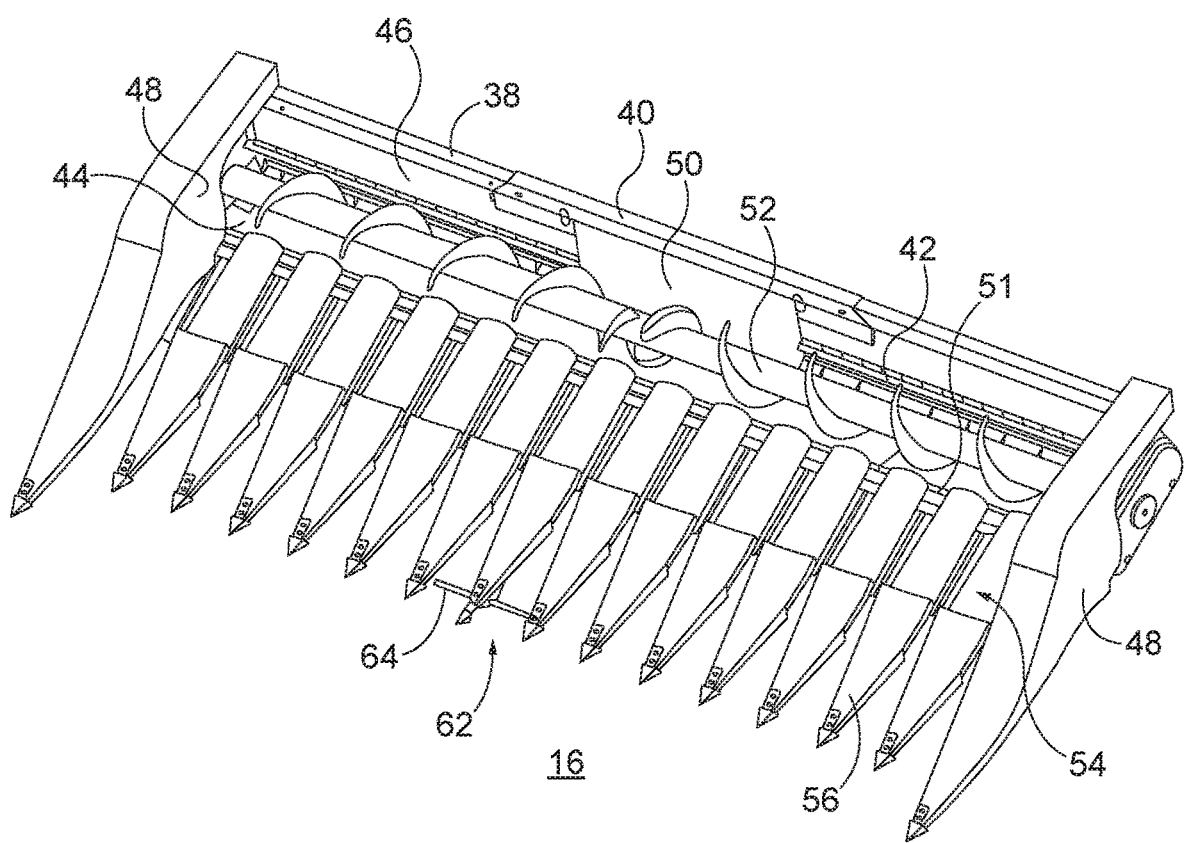
FIG. 2 is a perspective view of a header of the harvester of FIG. 1.

FIG. 2 shows an exemplary embodiment of the header 16 that includes a laterally extending frame 38, and that further comprises an upper beam 40, a lower beam 42, and a row unit support beam 51. The frame 38 comprises a trough 44, a rear wall 46 and end walls 48. An aperture 50 or opening is disposed in the center portion of rear wall 46 below upper beam 40 and above lower beam 42. The aperture 50 provides an opening for the transmission of crop material from the header 16 to the feederhouse 18 of the harvesting machine 10. Trough 44 extends laterally and is comprised of a laterally-extending curved sheet having a laterally-extending concave upper surface. Within trough 44, an auger 52 is mounted for receiving crop material from a plurality of row units 54 that are fixed to the row unit support beam. The row units 54 are mounted (e.g., rigidly mounted) to a row unit support beam 51 in side to side relationship and are distributed across the entire width of the header 16. In one illustrative configuration, each row unit 54 has two forwardly extending stalk rolls (not shown) that extend forward from the header 16 in the direction of travel for pulling the plant stalks or stems downward, two stripper plates above the stalk rolls forming a plucking gap for separating the ears or grain from the stalks, and two chain conveyors with attachment links for conveying the ears or grain towards the auger 52.

Between each two adjacent row units 54, a crop divider 56 is provided. The crop dividers 56 are rigidly or pivotally mounted around transverse axes in a defined pivot range to the adjacent row units 54 and are of a generally conical shape. For example, one or more of the crop dividers 56 may rotate vertically about an axis to compensate for differences or fluctuations in the land or terrain. In some embodiments, the crop dividers 56 are tapered towards the front or the direction of forward travel of the harvesting machine 10. A row sensing device 62 is mounted to one or more of the crop dividers 56. The row sensing device 62 comprises two opposite, transversely extending, movable arms 64 from the same crop divider 56; or in another embodiment, from adjacent crop dividers 56. Each arm 64 is located on a side of the crop divider 56 and is arranged to interact with one or more plants (e.g., corn plants, stalks or otherwise) within rows. In one embodiment, the arms 64 are composed of an elastomer, an elastically deformable material, a resilient material, or a flexible material. For example, the arms 64 may be composed of synthetic rubber, natural rubber, a fiber-reinforced plastic, or a fiber-reinforced polymer. In an alternative embodiment, each arm 64 comprises a rigid member, frame or skeleton that is coated with an elastomer, an elastically deformable material, a resilient material or a flexible material. In one configuration, each arm 64 may be biased with a spring or another resilient member to return to a predetermined rest position in the absence of the input of external force (e.g., from plants, stems or stalks). A sensor is associated with each of the row sensing devices 62, for example to detect the position or movement of an arm 64 or the impact on the arm 64. The sensor can include an analog-to-digital converter that converts the movement of the arm 64 to an electronic signal that is sent to a control unit. The control unit can use the data sent by the row sensing device 62 to control the movement of the vehicle to prevent it from veering off course and damaging rows of crops and/or to alert an operator to deviations in the vehicles path.

Figure 3:
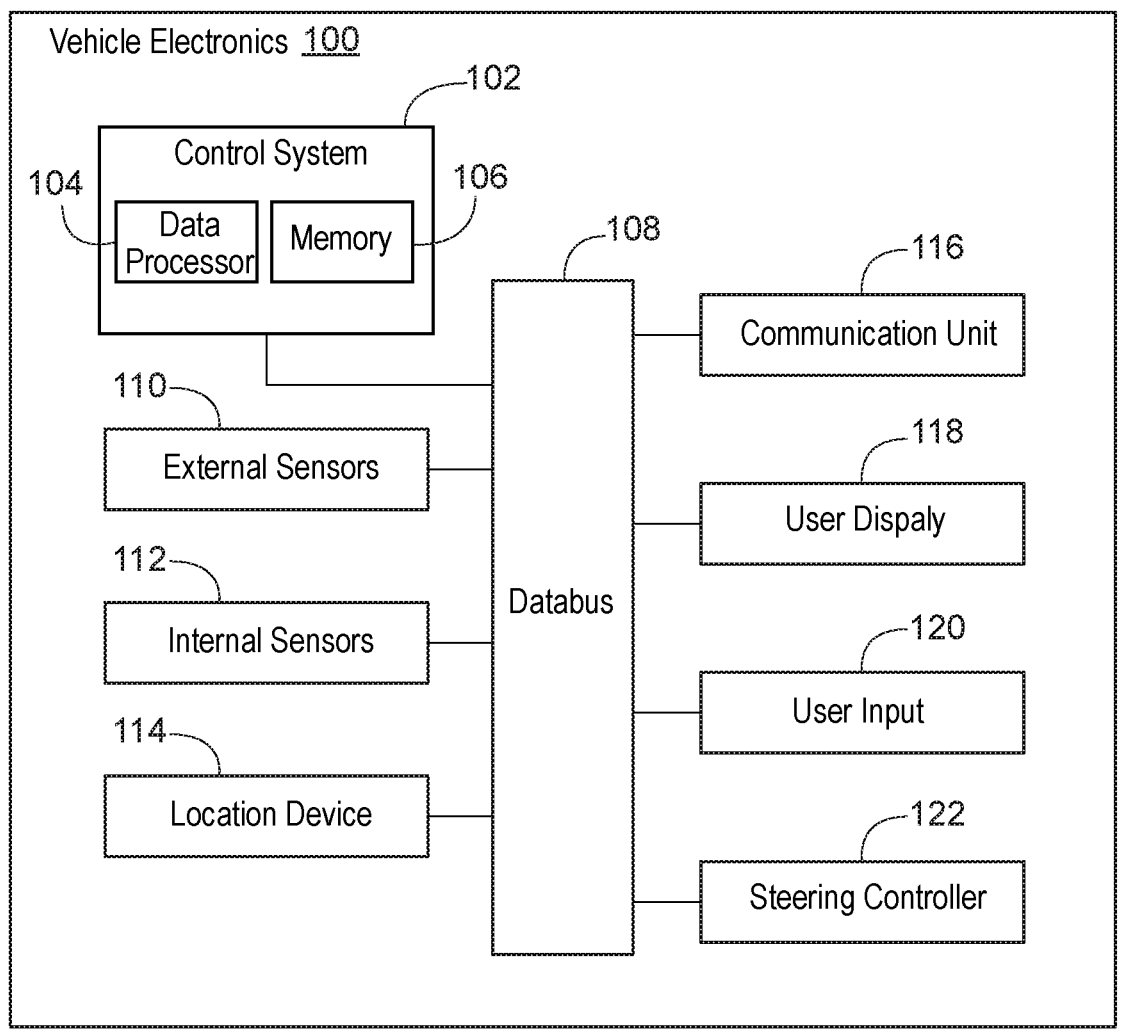
FIG. 3 is an exemplary control schematic of the harvester of FIG. 1.

FIG. 3 shows an exemplary schematic of an electronics system 100 for an industrial vehicle, for example the combine harvesting machine 10 of FIG. 1. The electronics system 100 includes various components associated with the operation and control of the harvesting machine 10. FIG. 3 shows a subset of the components and connections, as would be understood by one of ordinary skill in the art.

The exemplary electronics system 100 includes a control system 102. The control system 102 can include one or more controllers or electronic control units, for example an engine control unit and a vehicle control unit. The control system 102 can include one or more data processors 104 and one or more memory unit 106. When more than one control unit is present, each control unit can include its own data processor 104 and memory 106, or these resources may be shared between control units. The memory 106 comprises a non-transient computer-readable medium or persistent storage device for storing data for use by processor 104 or generated by processor 104. In some embodiments, the memory 106 may additionally store instructions in the form of code or software for processor 104. The instructions may be loaded in a random access memory (RAM) for execution by processor 104 from a read only memory (ROM), a mass storage device, or some other persistent storage. In other embodiments, hard wired circuitry may be used in place of or in combination with software instructions to implement the functions described. For example, at least regions of memory 106 and processor 106 can be embodied as part of one or more application-specific integrated circuits (ASICs). The memory 106 can be incorporated into the associated control unit, carried by the harvester 10 separate from the associated control unit, or be located remotely from the harvester and accessed by the associated control unit.

The control system 102 is connected to a databus 108. The databus coordinates communication between the different components in the electronics system 100, and provides information to the control system 102 and control signals from the control system to different components.

One or more external sensors no are configured to gather or monitor information that is external to the vehicle, and provide data to the control system 102 and/or an operator through the databus 104 or directly to another component. One example of an external sensor includes a crop data sensor such as the row sensing device 62 shown in FIG. 2. Another example of an external sensor can include a camera or other image capture device that provides images of the area outside of the vehicle including the vehicle path and surround crop images. The images can be provided to a user to allow for manual control or adjustment of the harvesting machine 10, or the images can be digitally processed and analyzed (e.g., using object or pattern recognition) to provide automatic control or adjustment of the vehicle.

One or more internal sensors 112 are configured to gather or monitor information internal to the vehicle, and provide data to the control system 102 and/or an operator through the databus 104 or directly to another component. Examples of internal sensors include engine, exhaust, fuel, braking, and tire pressure sensors.

A location device 114 provides vehicle location and navigation information to the control system 102. The location device 114 can be part of a GPS (Global Positioning System) system mounted to the vehicle. Different positioning and navigation systems can also be used, including a DGPS (Differential Global Positioning System), a Galileo Positioning System, a Global Navigation Satellite System (GNSS), or the like. The location device 114 can also utilize terra-based location signals, such as WiFi and BLUETOOTH based signals. In an exemplary embodiment, the location device 114 includes an antenna and a receiver. The antenna is configured to collect satellite-based navigation system signals. The antenna can be water-proof/water resistant and/or include magnetic mounts for allowing the antenna to be secured to the vehicle. The receiver is configured to receive the collected satellite-based navigation system signals and, based on the collected signals, can be further configured to determine (e.g., dynamically determining/updating in real-time) current location information of/corresponding the vehicle. Location information can be sent to the control system 102 and also be displayed to a user. The control system can process the information The communication unit 116 is configured to locally and remotely communicate information over a communication network. The communication unit 116 can provide communication over different wired or wireless systems and networks including mobile, satellite, Wi-Fi, near-field, Bluetooth, or a combination thereof as needed. In an exemplary embodiment, the communication unit 116 is a telematics system. The telematics system includes, for example, a network of regional, national, or global hardware and software components. In addition, the telematics service may be provided by a private enterprise, such as an independent third-party company that provides the service to other companies, a manufacturing company that provides the service to its customers, or a company that provides the service to its own fleet of vehicles. Alternatively, the telematics service may be provided by a governmental agency as a public service. JDLink™ is an example of an agricultural vehicle telematics service, which is available from John Deere & Company.

User display 118 includes a device by which information may be visually presented to an operator of the harvesting machine 10 in the cab 36, or to a remotely located monitor or operator of the harvester 10. The display 118 includes a monitor or screen positioned in the cab 36 or in a remote location. In some embodiments, the display 118 can be mobile in nature, being provided as part of a computer tablet, smart phone, and the like.

The user input 120 includes one or more devices that allow the operator to control or otherwise provide input to the vehicle. Examples of the user input 120 include, but are not limited to, a keyboard, a touchpad, a touch screen, a steering wheel or steering control, a joystick, a microphone with associated speech recognition software and/or the like. In some embodiments, one of the user inputs 120 can be incorporated into the display 118, for example a touchscreen display.

A steering controller 122 receives control data or a control signal from the control system 102. The steering controller 122 controls, turns or steers one or more steerable wheels or other ground engaging members of the vehicle in response to a control signal, control data or other output. The steering controller 122 can include a controller for sending a signal to an electro-hydraulic valve, a solenoid, or an electro-mechanically controlled device for controlling a hydraulic steering system. In an alternative embodiment, the steering controller 122 can include a controller for sending an electrical signal to an electric motor for an electrical steering system.

According to an exemplary embodiment, the vehicle can be configured for automatic steering and navigation based partially on the input from the location device 114 and automatic steering control through the steering controller 122. An example of such a system includes the AutoTrac Assisted Steering System, produced by Deere & Company. When an operator of the vehicle activates the automatic steering, the vehicle will attempt to immediately navigate onto/acquire a targeted path (e.g. a crop row).

For example, the vehicle may be guided along a first path by the automatic steering system. Upon reaching the end of the first path, the operator can manually begin to turn the vehicle around so as to begin to position the vehicle for navigation along a second path. The operator selects a second path and then re-activates the automatic steering to allow the system to automatically assist in navigating the vehicle onto and along the second path. Once the automatic steering is activated, the vehicle will attempt to immediately acquire and navigate onto the newly selected path. The path order can be planned ahead of time and stored in the memory 106, or it can be stored remotely and acquired through the communication unit 116. Examples of automatic path planning and selection is described in greater detail in U.S. Pat. No. 8,498,788, the entire disclosure of which is incorporated herein by reference.

A problem can exists, however, if a user fails to select a new path, the newly selected path is the wrong path, or if the system fails to properly acquire the new path. When this happens, the vehicle can veer drastically off course when the automatic steering is activated. This can cause damage to the vehicle and/or the surrounding area. For example, when beginning to harvest a corn field, an operator can run in a north-south path when opening the field and then in east-west paths for the remainder of the field. If the operator does not set a new guidance path when changing directions, the previous line will be used by the automatic steering system, even if the vehicle has been driven manually for an amount of time to align the machine with the crop in the new direction. To prevent this, the control system 102 can implement a path correction that prevents the vehicle from veering off an intended course set by the operator.

According to an exemplary embodiment, the path correction can be implemented by the control system 102. In an exemplary embodiment, the path correction can determine a difference in the vehicles current path and an automatically guided path before the automatic steering takes over. If the difference in the current path and the selected path is beyond a threshold value, a new path is established for the vehicle. The difference can be determined by using statistical modeling, such as linear regression modeling. The path corrector can include input from other sensors, including row feelers and/or cameras to determine if a new path should be established, and to help establish the new path. This can eliminate the vehicle from moving in an undesired direction.

Figure 4:
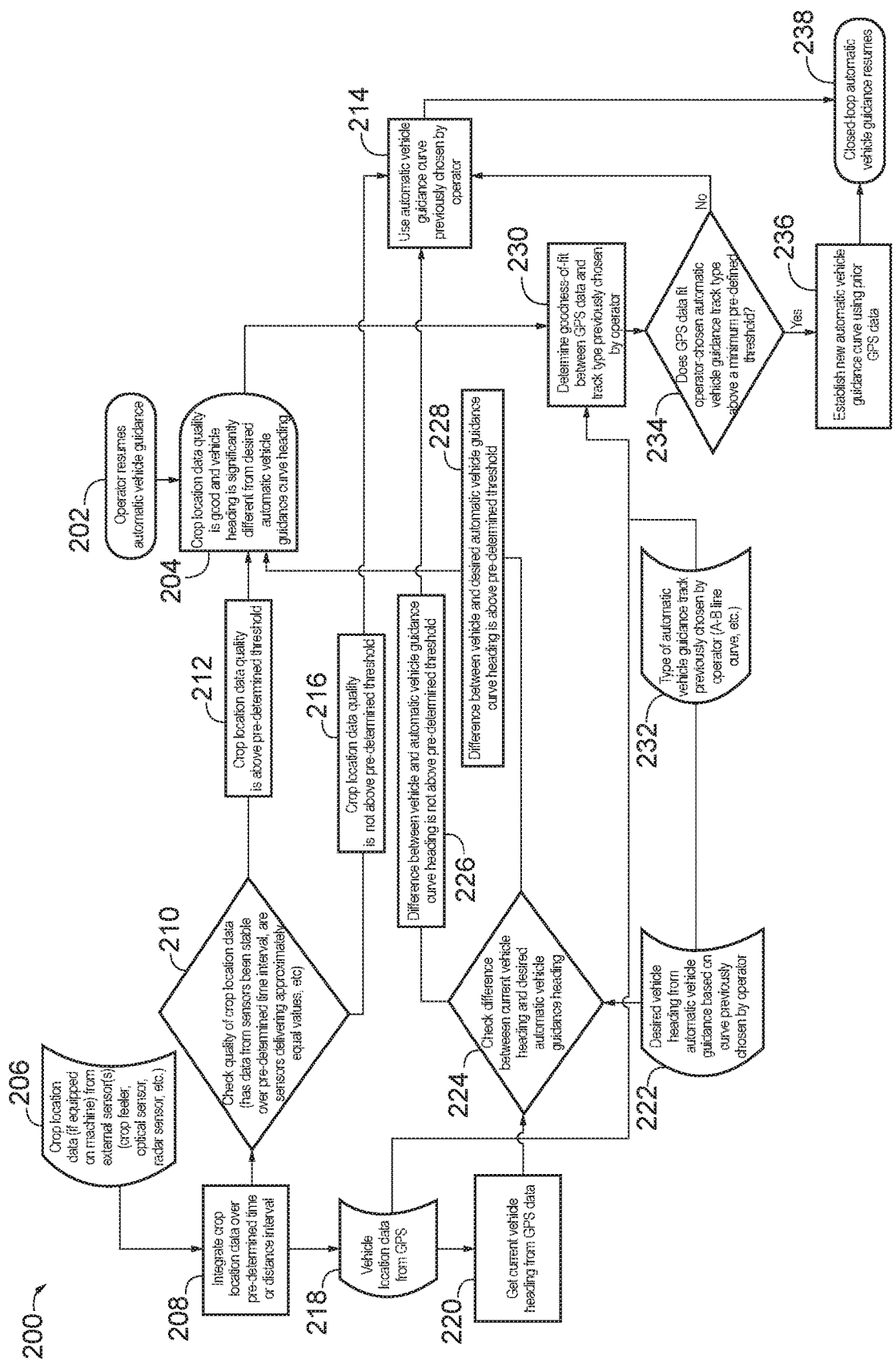
FIG. 4 is a flow chart showing an exemplary path correction.

FIG. 4 shows an exemplary embodiment of the path correction 200 that can be performed by the control system 102. Initially, the operator engages the automatic steering systems (step 202), for example the AutoTrac system. The path correction 200 obtains data from one or more inputs as an initial check to determine if path correction is needed (step 204). For example, the system 200 can determine the quality of crop location data (if available) and if the current vehicle heading is significantly different from the initial automatic guidance curve.

Crop location data (if available), for example row sensing, can be gathered (step 206) from the external sensors 108, such as the mechanical row sense device 62, an optical row sense device (e.g. camera system), radar sensor, and/or similar device. If crop location data is present, the crop location data is integrated for a period of time, distance interval, or a combination of both (step 208). The crop location data can be integrated from when the AutoTrac system is activated (step 202) to a set time/distance after activation, the data can be retrieved from past events when the AutoTrac system is activated (step 202), or a combination of both.

After the crop location data is compiled, a quality check is performed (step 210) to determine the quality of the data. For example, the data can be analyzed to determine if it has been stable or within expected parameters over a time interval or that sensors are delivering equal or coordinating values. The quality check 210 can determine if the data quality is above a predetermined threshold. If the data quality is not above the threshold (step 212), the system proceeds based on GPS based guidance to use the initial automatic guidance path (step 214). If the data quality is above the threshold (step 216), the information passed on and is used to further determine if path correction is needed (step 204).

The path correction 200 also integrates location data (step 218) for a period of time, distance interval, or a combination of both. The location data can be integrated from when the AutoTrac system is activated (step 202) to a set time/distance after activation, the data can be retrieved from past events when the AutoTrac system is activated (step 202), or a combination of both. After the GPS data is compiled, the current vehicle heading is obtained (step 220) and the heading from initial automatic guidance path is obtained (step 222).

The difference between the current vehicle heading and the initial automatic guidance path is then determined (step 224). If the difference between the current heading and the initial automatic guidance path is below a predetermined threshold (step 226), then the system proceeds based on GPS based guidance to use the initial automatic guidance curve (step 214). If the difference between the current heading and the initial automatic guidance path is above the predetermined threshold (step 228), the information is used to further determine if path correction is needed (step 204).

If the data checks pass the thresholds, the system proceeds to analyze the difference between the current GPS path data and the initial automatic guidance path (step 230). The type of path (A-B line, curve, etc.) can be obtained (step 232) and used in making the analysis. Different statistical models can be used to make this analysis, for example a goodness-of-fit model.

Next, it is determined if the difference between the current GPS path data and the initial automatic guidance path is above a threshold (step 234). For example, goodness-of-fit modeling can be performed and the result can be compared to a pre-defined threshold. If the result is not above the threshold, then the system proceeds based on GPS based guidance to use the initial automatic guidance curve (step 214). If the result is above the threshold, a new guidance path is established (step 236). The new path can be established or selected manually by a user or automatically by the system based on prior paths and path types, crop location data, and the GPS data. After the new guidance path (step 236) is established or after the system proceeds to use the initial automatic guidance curve (step 214), the system resumes automatic guidance (step 238).

The path correction 200 can be implemented by software module, hardware module, or combination of both. For example, path correction 200 can be implemented by firmware that is programmed into the memory and called by the processor anytime the automatic steering system is activated.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of implementing a vehicle path correction comprising:
    determining if a vehicle automatic steering system is engaged;
    determining an automatic steering system first path;
    compiling vehicle location data;
    determining a current vehicle heading from the compiled vehicle location data;
    determining if the difference between the current vehicle heading and the first path is above a current-heading threshold value;
    analyzing the compiled vehicle location data to model a second path if the difference between the current vehicle heading and the first path is above the current-heading threshold value;
    determining if a difference between the first path and the second path is greater than a path threshold value;
    determining a new path if the difference between the first path and the second path is greater than the path threshold value, wherein the new path does not intersect the first path; and
    outputting a signal configured to cause the vehicle automatic steering system to follow the new path.

2. The method of claim 1, wherein the new path is the same as the second path.

3. The method of claim 1, wherein the position data is integrated over a predetermined time interval subsequent to engagement of the automatic steering system.

4. The method of claim 1, wherein the location data is obtained from a GPS device.

5. The method of claim 1, wherein the signal is output to a steering controller.

6. The method of claim 1, further comprising outputting the new path to a display device.

7. The method of claim 1, further comprising selecting the first path if the difference between the current vehicle heading and the first path is below the current-heading threshold value and outputting a signal configured to cause the vehicle automatic steering system to follow the first path.

8. The method of claim 1, further comprising compiling object sensing data.

9. The method of claim 8, wherein the object sensing data is integrated over a predetermined interval subsequent to engagement of the automatic steering system.

10. The method of claim 8, further comprising performing a quality check on the compiled object sensing data.

11. The method of claim 8, wherein the object sensing data is obtained from a mechanical row sensing device.

12. A vehicle control system comprising:
a control unit operatively connected to a vehicle engine;
a location device operatively connected to the control unit; and
a steering controller operatively connected to the control unit and configured to automatically control the path of the vehicle,
wherein the control unit includes a path correction system configured to,
determine a current vehicle path from location data received from the location device,
determine if the current vehicle path is different from a first automatic path,
establish a second automatic path that does not intersect the first automatic path, and
send a signal to the steering controller to follow the second automatic path in response to the difference between the current vehicle path and the first automatic path being above a threshold value.

13. The vehicle control system of claim 12, wherein the path correction system is configured to analyze the vehicle location data to model the current path of the vehicle.

14. The vehicle control system of claim 13, wherein the second automatic path is manually selected by a user.

15. The vehicle control system of claim 12, further comprising an object sensing system operatively connected to the control unit.

16. The vehicle control system of claim 15, wherein the object sensing system includes a camera.

17. The vehicle control system of claim 15, wherein the object sensing system includes a mechanical row sensing device.

18. An industrial vehicle comprising:
an engine;
a ground engaging member operatively coupled to the engine;
a control unit operatively connected to the engine;
a location device operatively connected to the control unit; and
a steering controller operatively connected to the control unit and the ground engaging member and configured to automatically control the path of the vehicle,
wherein the control unit includes a path correction system configured to
determine a current vehicle path from location data received from the location device,
determine if the current vehicle path is different from a first automatic path,
establish a second automatic path that does not intersect the first automatic path, and
send a signal to the steering controller to follow the second automatic path in response to the difference between the current vehicle path and the first automatic path being above a threshold value.

19. The industrial vehicle of claim 18, wherein the second automatic path is manually selected by a user.

20. The vehicle control system of claim 18, further comprising an object sensing system operatively connected to the control unit.

* * * * *